(12) United States Patent
Skaggs et al.

(10) Patent No.: US 8,370,102 B1
(45) Date of Patent: Feb. 5, 2013

(54) COMPUTER AIDED FEATURE ALIGNMENT PROCESS

(75) Inventors: Kirk Douglas Skaggs, Federal Way, WA (US); Barry Theophile Cooke, Black Diamond, WA (US); David T. Lammers, Bonney Lake, WA (US); Michael J. Swartz, Federal Way, WA (US)

(73) Assignee: The Boeing Company, Chicago, IL (US)

(*) Notice: Subject to any disclaimer, the term of this patent is extended or adjusted under 35 U.S.C. 154(b) by 396 days.

(21) Appl. No.: 12/728,886

(22) Filed: Mar. 22, 2010

(51) Int. Cl.
*G01L 1/00* (2006.01)

(52) U.S. Cl. ........................................ 702/123

(58) Field of Classification Search ............... 702/123, 702/182–185
See application file for complete search history.

(56) References Cited

U.S. PATENT DOCUMENTS

| 6,622,091 B2 | 9/2003 | Perlmutter et al. |
| 2012/0123628 A1* | 5/2012 | Duggan et al. ............. 701/24 |

* cited by examiner

*Primary Examiner* — Edward Raymond
(74) *Attorney, Agent, or Firm* — Yee & Associates, P.C.

(57) ABSTRACT

The different advantageous embodiments provide a method for alignment of platform features. A number of feature locations for a platform is identified using a platform model. A number of platform instructions for taking measurements at the number of feature locations is identified using the platform model. Instructions are generated having a number of measurement locations for each feature location in the number of feature locations for the platform.

20 Claims, 6 Drawing Sheets

COMPUTER AIDED FEATURE ALIGNMENT PROCESS

BACKGROUND INFORMATION

1. Field

The present disclosure relates generally to a data processing system and more particularly to a measurement and alignment system for platform features. More specifically, the present disclosure relates to a computer aided feature alignment system.

2. Background

An aircraft is one type of platform with features requiring alignment. In an aircraft, a number of sensors are used by the flight deck to obtain data about the aircraft and the environment around the aircraft. The integrity of that sensor data relies upon the proper alignment and positioning of the sensors. Aircraft or platforms that utilize multiple sensors require that each sensor be pointing to or receiving data from a known direction. The primary direction of a platform is typically developed from a gyroscope.

A gyroscope is used to establish the primary reference location on the platform, using the Navigation Gyroscope Tray. In order to provide measurement of sensor alignment on an aircraft platform, the platform is leveled with the Earth and the gyroscope is powered up and allowed to stabilize. The angular position of the gyroscope is zeroed so that the current attitude of the gyroscope can be the reference to which all future measurements will be registered. The starting time is recorded and the gyroscope is removed from the primary location and placed in a tray at a sensor location.

In order to take these measurements, the sensors are removed from their locations and replaced with a tray that can accommodate the gyroscope. When a gyroscope is placed into a tray at a sensor location, the gyroscope is again allowed to stabilize and the angular measurements are then recorded. The gyroscope is then returned to the primary location and checked for drift in relation to the starting measurement. If the measurement is within acceptable limits, the process is repeated for the remainder of sensor locations of a platform. This manual process is time consuming and labor intensive. Gyroscopes are also affected by the precession error caused by the Earth's movement reacting on the gyro, which limits the amount of time that can be used to perform a measurement set without incurring accumulated error.

Therefore, it is advantageous to have a method and apparatus that takes into account one or more of the issues discussed above, as well as possibly other issues.

SUMMARY

The different advantageous embodiments provide a method for alignment of platform features. A number of feature locations for a platform is identified using a platform model. A number of platform instructions for taking measurements at the number of feature locations is identified using the platform model. Instructions are generated having a number of measurement locations for each feature location in the number of feature locations for the platform.

The different advantageous embodiments further provide a method for measurement of platform features. In response to identifying a platform type, instructions to perform a number of measurements for a number of features associated with a platform are generated. A platform model is generated for the platform type identified using platform descriptions and platform images. The platform model and the instructions generated are displayed using a graphical user interface. A number of measurement commands corresponding to the platform instructions is received. A number of measurements is performed to form measurement data.

The different advantageous embodiments further provide a system for automatic alignment of platform features comprising a number of computer aided measurement devices, a number of computers, and an alignment process. The number of computers is configured to generate instructions for the number of computer aided measurement devices to take a number of measurements. The alignment process is configured to calculate a number of alignments for a number of features using the number of measurements.

The different advantageous embodiments further provide a computer program product having computer usable program code stored on a computer readable storage medium for alignment of platform features. The computer usable program code is executed by a computer to generate instructions to perform a number of measurements for a number of features associated with a platform in response to identifying a platform type. A platform model is generated for the platform type identified using platform descriptions and platform images. The platform model and the instructions generated are displayed using a graphical user interface. The number of measurements are performed to form measurement data in response to receiving a number of measurement commands.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
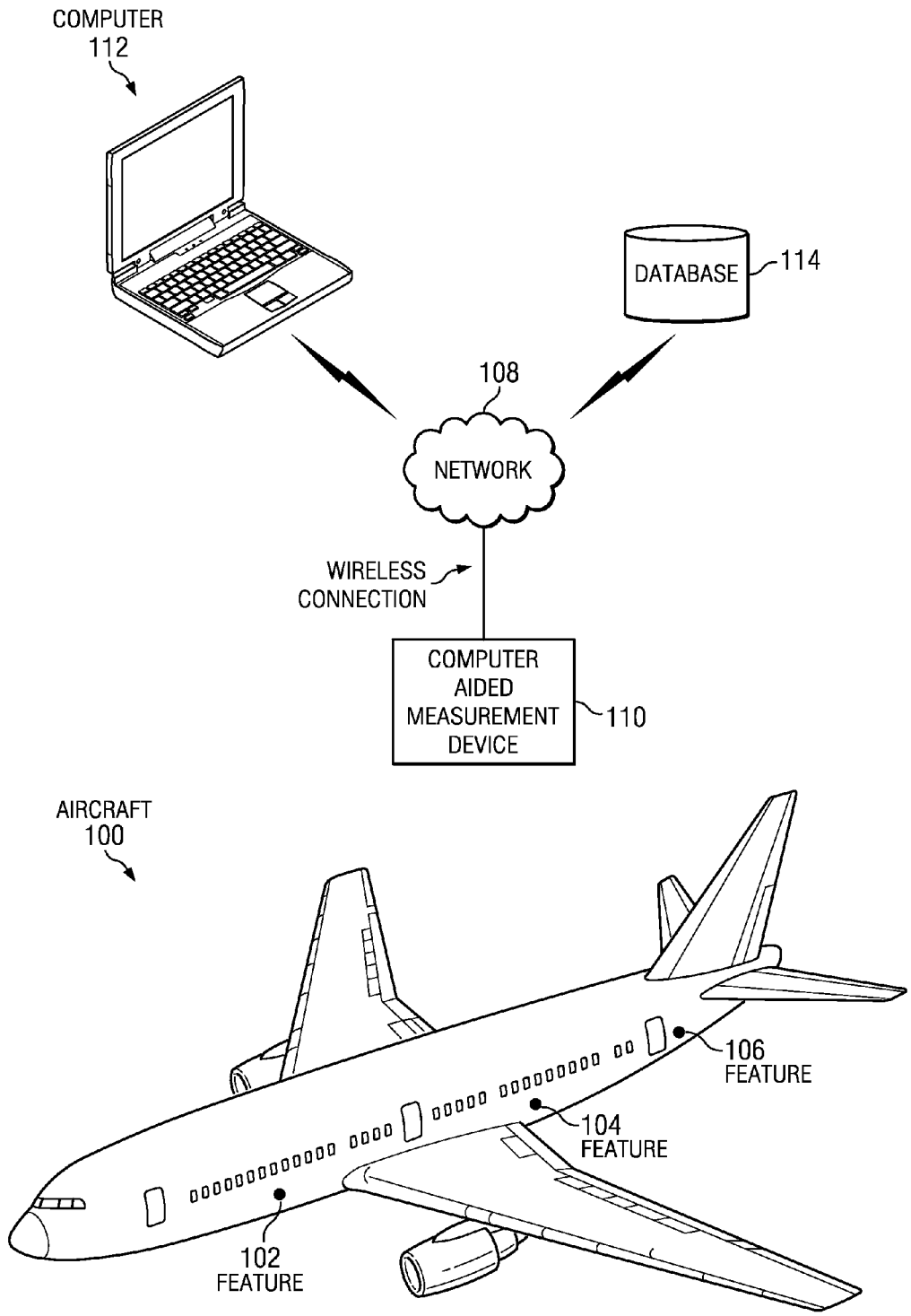
FIG. 1 is an illustrative diagram of a data processing environment in accordance with an advantageous embodiment.

With reference now to the figures and in particular with reference to FIG. 1, an illustrative diagram of a data processing environment is provided in which advantageous embodiments may be implemented. It should be appreciated that FIG. 1 are only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which advantageous embodiments may be implemented. Aircraft 100 is an illustrative example of one type of platform in which advantageous embodiments may be implemented. Aircraft 100, in this illustrative example, has feature 102, feature 104, and feature 106. Feature 102, feature 104, and feature 106 are illustrative examples of a platform feature requiring alignment. For example, feature 102, feature 104, and feature 106, may each be sensors that make up a sensor system for aircraft 100.

Network 108 which is the medium used to provide communication links between various devices and computers connected together within a network data processing environment. Network 108 may include connections, such as wire, wireless communication links, or fiber optic cables.

In the depicted example, computer aided measurement device 110, computer 112, and database 114 connect to network 108. Computer aided measurement device 110 may be, for example, a laser tracker, broken arm instrument, optical theodalite, and/or any suitable type of measurement device. Computer 112 may be, for example, personal computers or network computers. Database 114 may be located remote from computer 112 and computer aided measurement device 110 and accessed over network 108. In another illustrative example, database 114 may be implemented within computer 112.

Program code located in computer 112 may be stored on a computer recordable storage medium and downloaded to a data processing system or other device for use. For example, program code may be stored on a computer recordable storage medium on computer 112 and downloaded to computer aided measurement device 110 over network 108 for use in taking measurements and generating alignment instructions for features 102, 104, and 106 of aircraft 100.

In the depicted example, network 108 represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network 108 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
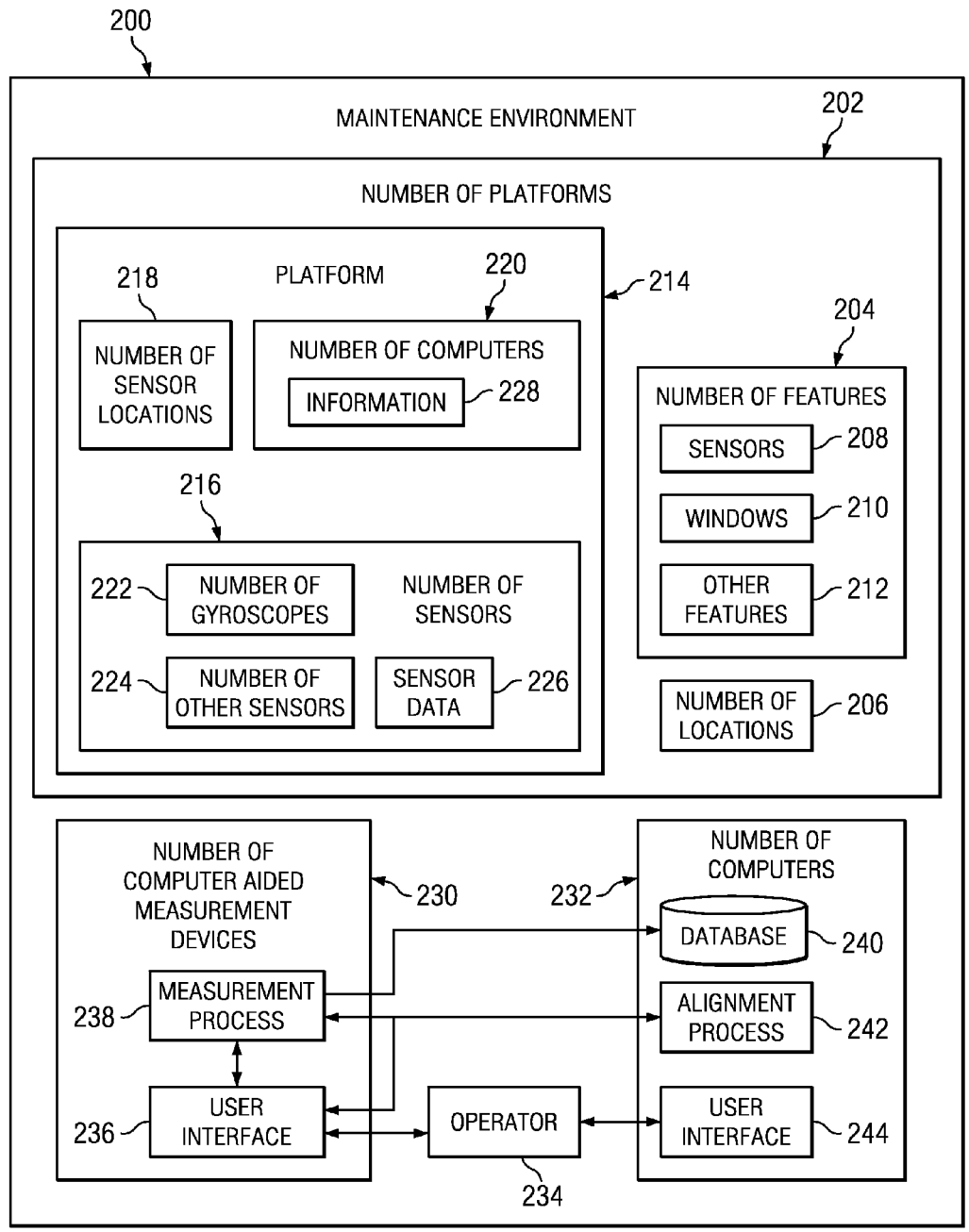
FIG. 2 is a diagram of a data processing system in accordance with an advantageous embodiment.

With reference now to FIG. 2, a maintenance environment is depicted in accordance with an advantageous embodiment. Maintenance environment 200 may be implemented in a network environment such as network data processing system 100 in FIG. 1. Maintenance environment 200 includes number of platforms 202. Number of platforms 202 may be any type of platform having alignment requirements. For example, number of platforms 202 may be, without limitation, aircraft, spacecraft, ships, stationary buildings, and/or any other platform having features requiring alignment. Aircraft 100 in FIG. 1 is an illustrative example of number of platforms 202. In these examples, number of platforms 202 includes number of features 204. Number of features 204 is associated with number of locations 206 of number of platforms 202. As used herein, a first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

Number of features 204 may be any type of platform feature requiring alignment. For example, number of features 204 may be, without limitation, sensors 208, windows 210, other features 212, and/or any other suitable feature requiring alignment. Other features 212 may include, for example, without limitation, active radars, passive radars, missile warning sensors, infrared detectors, optical cameras, and/or any other suitable feature requiring alignment. In one illustrative example, windows 210 may be features of a stationary building platform. In another illustrative example, sensors 208 may be features of an aircraft or spacecraft platform.

Platform 214 is an illustrative example of one implementation of number of platforms 202. In these illustrative examples, platforms 214 may be implemented using aircraft 100 in FIG. 1. Platform 214 includes number of sensors 216, number of sensor locations 218, and number of computers 220. In one illustrative example, platform 214 may be an aircraft. Platform 214 requires that each sensor in number of sensors 216 be aligned in order to provide accurate sensor data to number of computers 220 of platform 214. Alignment refers to each sensor pointing to or receiving data from a known direction. In other words, alignment is the direction in which a sensor receives data. Each sensor in number of sensors 216 may be assigned to a location from number of sensor locations 218. Number of sensor locations 218 may be distributed throughout platform 214.

Number of sensors 216 may include number of gyroscopes 222 and number of other sensors 224. Number of gyroscopes 222 is a directional system used to establish the primary reference location of platform 214. As used herein, number of refers to one or more item and/or object. In an illustrative example of an aircraft, number of gyroscopes 222 may provide information about the direction, roll, pitch, yaw, rotation, and/or heading of the aircraft. Number of other sensors 224 may include, for example, without limitation, active radars, passive radars, missile warning sensors, infrared detectors, optical cameras, and/or any other suitable sensor requiring alignment.

Number of computers 220 use sensor data 226 from number of sensors 216 to generate information 228 about platform 214 and an environment around platform 214. Number of computers 220 requires information about the direction and/or alignment of each sensor in number of sensors 216 in order to accurately generate information 228.

Maintenance environment 200 also includes number of computer aided measurement devices 230, number of computers 232, and operator 234. Number of computer aided measurement devices 230 may be any type of device for measuring physical geometrical characteristics of an object. For example, number of computer aided measurement devices 230 may be, without limitation, a laser tracker, a coordinate measuring machine, an optical theodolite, laser scanner, laser radar, and/or any other suitable measurement device.

Number of computer aided measurement devices 230 is connected to number of computers 232. As used herein, when a first component is connected to a second component, the first component may be connected to the second component without any additional components. The first component also may be connected to the second component by one or more other components. For example, one electronic device may be connected to another electronic device without any additional electronic devices between the first electronic device. In some cases, another electronic device may be present between the two electronic devices connected to each other. In other cases, a first component may be connected to a second component using wireless connections.

Operator 234 may be, for example, without limitation, a human user, a robotic machine, a computer executed process, and/or any other suitable operator of computer aided measurement devices.

Number of computer aided measurement devices 230 includes user interface 236 and measurement process 238. User interface 236 may include, for example, without limitation, a display, a keyboard, a mouse, a touchscreen, an optical interface, a visual interface, a tactile interface, and/or any other suitable interface. User interface 236 allows operator 234 to interact with number of computer aided measurement devices 230 and receive instruction for taking measurements using number of computer aided measurement devices 230.

Measurement process 238 includes algorithms for taking measurements of number of features 204 in number of platforms 202, such as number of sensors 216 in platform 214, for example. Measurement process 238 may receive measurement instructions from alignment process 242 in number of computers 232, in one illustrative example. Measurement process 238 may also receive measurement instructions from operator 234 via user interface 236, in another illustrative example.

Number of computers 232 includes database 240, alignment process 242, and user interface 244. Database 240 includes information about number of platforms 202. Database 240 may include information such as, for example, without limitation, platform descriptions, platform images, platform instructions, platform measurements, and/or any other suitable information.

Alignment process 242 uses information from database 240 to generate a model of a selected platform, such as platform 214. In an illustrative example, alignment process 242 displays the model of platform 214 to operator 234 via user interface 236 and/or user interface 244. The platform model provides instructions for operator 234 to place number of computer aided measurement devices 230 at number of sensor locations 218 in order to take measurements of number of sensors 216, in this illustrative example.

User interface 244 may include, for example, without limitation, a display, a keyboard, a mouse, a touchscreen, an optical interface, a visual interface, a tactile interface, and/or any other suitable interface.

Operator 234 may physically place number of computer aided measurement devices 230 at number of sensor locations 218 according to instructions received by alignment process 242 via user interface 236 and/or user interface 244. Operator 234 may initiate measurement commands each time number of computer aided measurement devices 230 is at a designated location for measurement. A designated location for measurement is any location provided in instructions from alignment process 242 as a sensor location where measurement is required. In one advantageous embodiment, each time operator 234 initiates a measurement command, measurement process 238 takes a number of measurements and stores the measurement results in database 240. In another advantageous embodiment, measurement process 238 may transmit the measurement results to alignment process 242 for analysis and storage in database 240.

Alignment process 242 uses the measurements provided by measurement process 238 to generate alignment calculations for number of features 204 of number of platforms 202, such as number of sensors 216 in this illustrative example. Alignment process 242 initiates measurement process 238 by providing automatic instructions to operator 234 and by controlling the function of number of computer aided measurement devices 230 as measurement commands are received from operator 234.

The illustration of maintenance environment 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Although number of platforms 202 has been described with respect to aircraft, number of platforms 202 may be applied to other types of platforms. For example, without limitation, other advantageous embodiments may be applied to a mobile platform, a stationary platform, a land-based structure, an aquatic-based structure, a space-based structure and/or some other suitable object. More specifically, the different advantageous embodiments may be applied to, for example, without limitation, a submarine, a bus, a personnel carrier, tank, a train, an automobile, a spacecraft, a space station, a satellite, a surface ship, a power plant, a dam, a manufacturing facility, a building, an array of objects, and/or some other suitable object.

For example, database 240 may be implemented remote from number of computers 232 and configured for wireless access by number of computers 232, in one advantageous embodiment. In another advantageous embodiment, database 240 may be implemented in number of computers 220 of platform 214 and configured for wireless access by number of computers 232. In yet another advantageous embodiment, number of computer aided measurement devices 230 may be integrated with number of computers 232, where alignment process 242 and database 240 are implemented in number of computer aided measurement devices 230.

Figure 3:
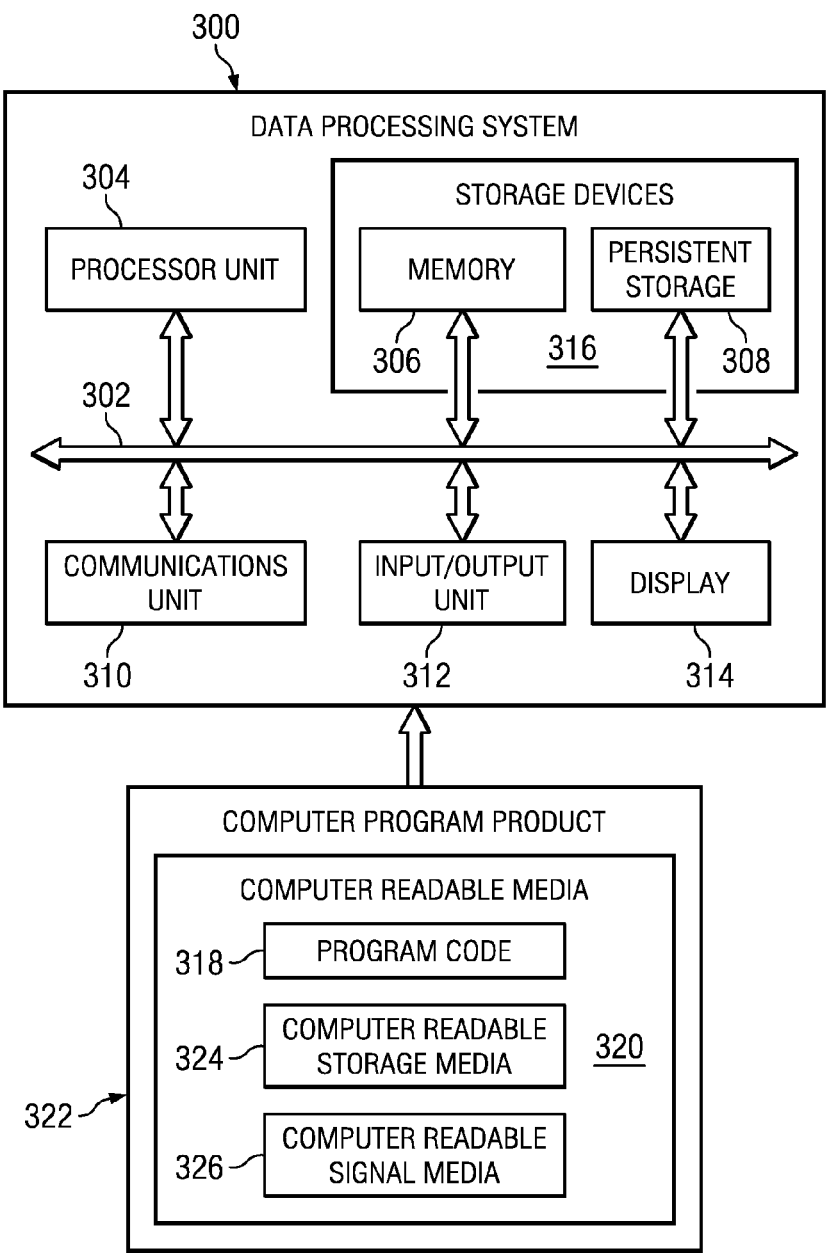
FIG. 3 is a maintenance environment in accordance with an advantageous embodiment.

Turning now to FIG. 3, a diagram of a data processing system is depicted in accordance with an advantageous embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems, in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Memory 306, in these examples, may be, for example, a random access memory, or any other suitable volatile or non-volatile storage device. Persistent storage 308 may take various forms, depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 may be removable. For example, a removable hard drive may be used for persistent storage 308.

Communications unit 310, in these examples, provides for communication with other data processing systems or devices. In these examples, communications unit 310 is a network interface card. Communications unit 310 may provide communications through the use of either or both physical and wireless communications links.

Input/output unit 312 allows for the input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code, in the different embodiments, may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322. In one example, computer readable media 320 may be computer readable storage media 324 or computer readable signal media 326. Computer readable storage media 324 may include, for example, an optical or magnetic disc that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory that is connected to data processing system 300. In some instances, computer readable storage media 324 may not be removable from data processing system 300.

Alternatively, program code 318 may be transferred to data processing system 300 using computer readable signal media 326. Computer readable signal media 326 may be, for example, a propagated data signal containing program code 318. For example, computer readable signal media 326 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 318 may be downloaded over a network to persistent storage 308 from another device or data processing system through computer readable signal media 326 for use within data processing system 300. For instance, program code stored in a computer readable storage media in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown. The different embodiments may be implemented using any hardware device or system capable of executing program code. As one example, data processing system 300 may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account a number of different considerations. For example, the different advantageous embodiments recognize and take into account that current methods for feature alignment utilize expensive gyroscopic reference units and physical tools that bolt to each feature location of a platform. In alignment of multiple sensors on an aircraft platform, current methods require removal of each sensor before the tooling can be installed to take the measurement at a specific location. In addition to the high precision physical tooling required for each sensor location, power supplies, cables, and specialized computers to run the gyroscope are required. Leveling of the platform with the Earth is also required prior to measurement with the gyroscope since its measurements are based on the Earth's reference.

Thus, the different advantageous embodiments provide a method for alignment of platform features. A number of feature locations for a platform is identified using a platform model. A number of platform instructions for taking measurements at the number of feature locations is identified using the platform model. Instructions are generated having a number of measurement locations for each feature location in the number of feature locations for the platform.

The different advantageous embodiments further provide a method for measurement of platform features. In response to identifying a platform type, instructions to perform a number of measurements for a number of features associated with a platform are generated. A platform model is generated for the platform type identified using platform descriptions and platform images. The platform model and the instructions generated are displayed using a graphical user interface. A number of measurement commands corresponding to the platform instructions is received. A number of measurements is performed to form measurement data.

The different advantageous embodiments further provide a system for automatic alignment of platform features comprising a number of computer aided measurement devices, a number of computers, and an alignment process. The number of computers is configured to generate instructions for the number of computer aided measurement devices to take a number of measurements. The alignment process is configured to calculate a number of alignments for a number of features using the number of measurements.

The different advantageous embodiments further provide a computer program product having computer usable program code stored on a computer readable storage medium for alignment of platform features. The computer usable program code is executed by a computer to generate instructions to perform a number of measurements for a number of features associated with a platform in response to identifying a platform type. A platform model is generated for the platform type identified using platform descriptions and platform images. The platform model and the instructions generated are displayed using a graphical user interface. The number of measurements are performed to form measurement data in response to receiving a number of measurement commands.

Figure 4:
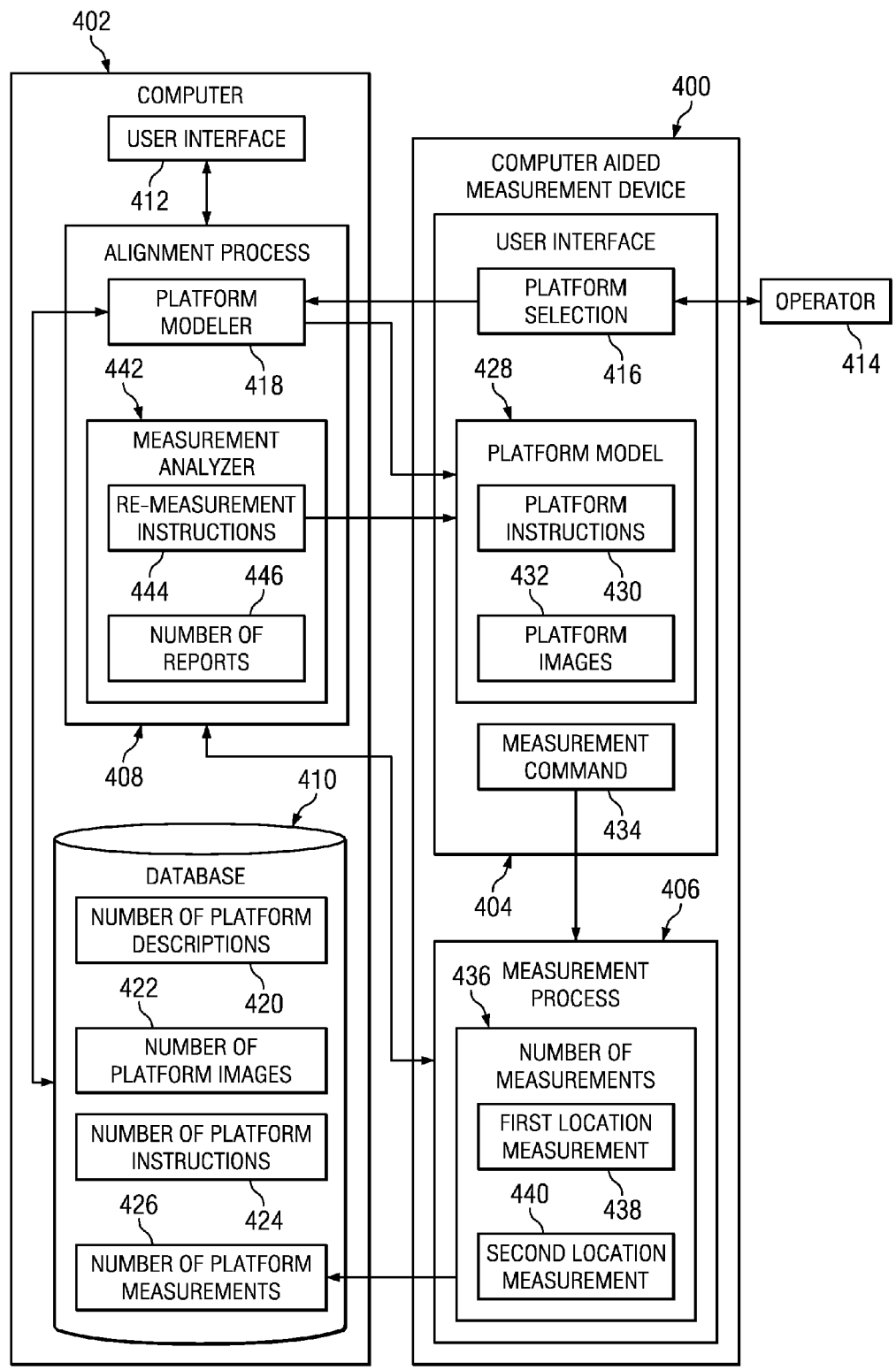
FIG. 4 is a computer aided measurement device in accordance with an advantageous embodiment.

With reference now to FIG. 4, a computer aided measurement device is depicted in accordance with an advantageous embodiment. Computer aided measurement device 400 is an illustrative example of one implementation of a computer aided measurement device in number of computer aided measurement devices 230 in FIG. 2.

Computer aided measurement device 400 is connected to computer 402. Computer aided measurement device 400 may be connected to computer 402 using a wireless connection over a network, such as network 108 in FIG. 1, for example.

Computer aided measurement device 400 includes user interface 404 and measurement process 406. User interface 404 is an illustrative example of one implementation of user interface 236 in FIG. 2. Measurement process 406 is an illustrative example of one implementation of measurement process 238 in FIG. 2.

Computer 402 includes alignment process 408, database 410, and user interface 412. Alignment process 408 is an illustrative example of one implementation of alignment process 242 in FIG. 2. Database 410 is an illustrative example of one implementation of database 240 in FIG. 2. User interface 412 is an illustrative example of one implementation of user interface 344 in FIG. 3.

Operator 414 may interact with computer aided measurement device 400 via user interface 404 and/or with computer 402 via user interface 412. User interface 404 and/or user interface 412 may provide a list or selection of a number of platform types. Platform types may be, for example, subcategories of an overall platform category. In an illustrative example, where the platform is an aircraft, platform types may refer to a type of aircraft, such as, without limitation, a Boeing 737, a Boeing 747, a Lockheed P-38 Lightning, a Lockheed F-16 Fighting Falcon, and/or any other suitable type of aircraft. Each type of platform may have specific feature locations and alignment requirements unique to that platform type. In one illustrative example, user interface 404 receives platform selection 416 from operator 414 and transmits the platform selection to alignment process 408 of computer 402. In another illustrative example, user interface 412 receives platform selection 416 from operator 414 and transmits the platform selection to alignment process 408.

When platform selection 416 is transmitted to alignment process 408, platform modeler 418 identifies the selected platform using information stored in database 410. Database 410 may include, for example, without limitation, number of platform descriptions 420, number of platform images 422, number of platform instructions 424, number of platform measurements 426, and/or any other suitable information.

Number of platform descriptions 420 includes information such as, without limitation, platform model numbers, platform types, platform identification, platform locations, platform features, platform feature locations, and/or any other suitable platform description information. Number of platform images 422 includes images associated with each platform in number of platform descriptions 420. Images may include, for example, without limitation, a number of different views and/or perspectives of each type of platform that may be used by platform modeler 418 to generate a three-dimensional model of a platform selected in platform selection 416.

Number of platform instructions 424 includes information on alignment requirements unique to the features of each type of platform in number of platform descriptions 420. Alignment requirements may include, for example, without limitation, information on a type of alignment required, a frequency of re-alignment required, the measurements required for alignment of a number of features, and/or any other suitable alignment requirements. Number of platform measurements 426 may include stored measurements from measurement process 406 associated with a number of different platforms. Number of platform measurements 426 may include, for example, previous measurements for a platform identified in number of platform descriptions 420, measurement history for a platform, current measurements of a platform, and/or any other suitable measurement information.

Platform modeler 418 uses information from database 410 to generate platform model 428. Platform model 428 is displayed to operator 414 via user interface 404, in this illustrative example. In another illustrative example platform model 428 may be displayed via user interface 412 on computer 402. Platform model 428 includes platform instructions 430 and platform images 432.

Platform instructions 430 are instructions for placement of computer aided measurement device 400 at a number of different locations required for measurement, such as number of sensor locations 218 in FIG. 2, for example. Platform images 432 may include, without limitation, a number of three-dimensional images of the platform selected by operator 414 in platform selection 416. Platform images 432 and platform instructions 430 may be integrated to provide visual depiction of each location computer aided measurement device 400 is to be placed for measurement.

Operator 414 is an illustrative example of one implementation of operator 234 in FIG. 2. Operator 414 may physically place computer aided measurement device 400 at a number of locations according to platform instructions 430 of platform model 428 provided by alignment process 408. Operator 414 may provide measurement command 434 via user interface 404 of computer aided measurement device 400 at each location indicated by platform model 428 for measurement. Measurement command 434 may be a prompt for measuring process 406 to take a measurement.

Measurement process 406 receives measurement command 434 and takes number of measurements 436 at a number of locations. For example, number of measurements 436 may include first location measurement 438 and second location measurement 440. Measurement process 406 may store number of measurements 436 in database 410 and/or transmit number of measurements 436 to alignment process 408 for analysis and storage in database 410.

Alignment process 408 includes measurement analyzer 442. Measurement analyzer 442 may process number of measurements 436 to determine if each measurement is acceptable for the platform selected. If an anomaly is encountered, or a measurement is not acceptable, measurement analyzer 442 may generate re-measurement instructions 444 and transmit re-measurement instructions 444 to user interface 404.

Measurement analyzer 442 processes number of measurements 436 to generate number of reports 446. Number of reports 446 may be used by platform computers to adjust sensors according to the required alignment determined by alignment process 408, for example. In an illustrative example, number of computers 320 in platform 214 in FIG. 2 uses number of reports 446 to adjust alignment of number of sensors 216 in FIG. 2 according to the alignment identified in number of reports 446. Each report in number of reports 446 is associated with a unique platform and date of the data acquisition for the report. Number of reports 446 may be stored in database 410 and/or number of computers 220 in FIG. 2, for example.

The illustration of computer aided measurement device 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, computer aided measurement device 400 may be implemented on computer 402, in one advantageous embodiment. In another advantageous embodiment, database 410 may be located remote from computer 402 and computer aided measurement device 400 and configured for remote access by alignment process 408, for example.

Figure 5:
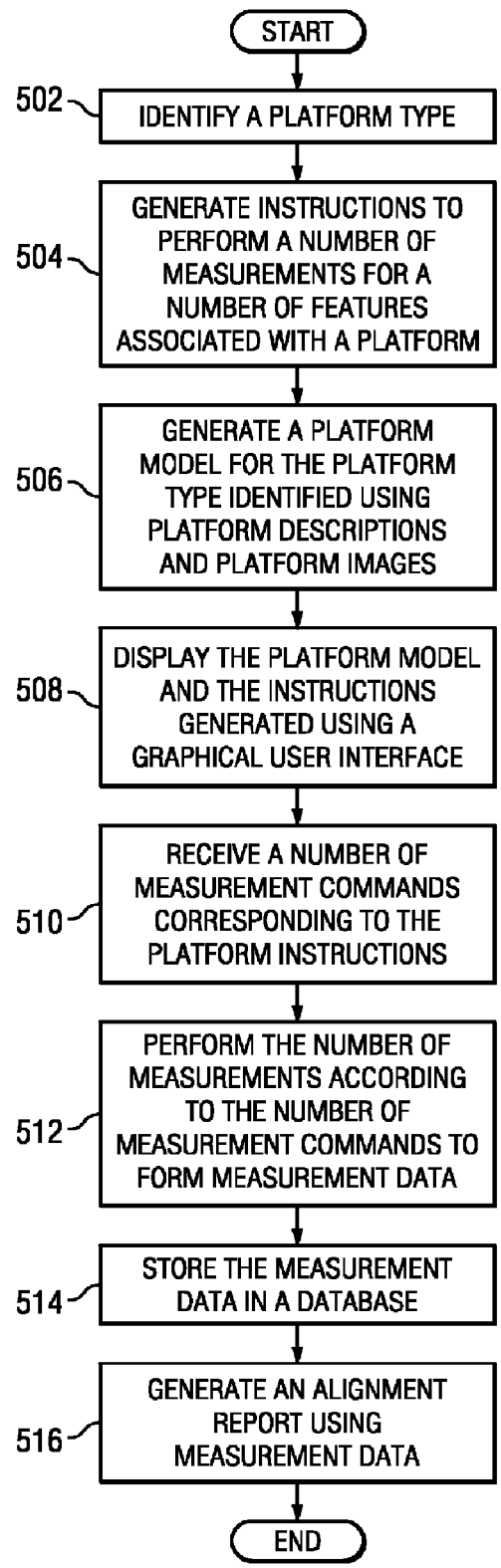
FIG. 5 is a flowchart illustrating a process for measurement of platform features in accordance with an advantageous embodiment.

With reference now to FIG. 5, a flowchart illustrating a process for measurement of platform features is depicted in accordance with an advantageous embodiment. The process in FIG. 5 is implemented by a component such as alignment process 242 in FIG. 2 and/or alignment process 408 in FIG. 4.

The process begins by identifying a platform type (operation 502). A selection of a platform type may be received from an operator, such as operator 234 in FIG. 2, via a user interface, such as user interface 244 in FIG. 2, for example. The platform type may be selected from a list of options provided by an alignment process via the user interface, for example. The process identifies the platform type selected by an operator in this illustrative example.

The process generates instructions to perform a number of measurements for a number of features associated with a platform (operation 504). The instructions may include, for example, identification of a number of locations where a measurement device is to be placed in order to take measurements of the platform features.

The process generates a platform model for the platform type identified using platform descriptions and platform images (operation 506). The platform descriptions and platform images may be retrieved from a database, such as, database 240 in FIG. 2 and/or database 410 in FIG. 4. The platform descriptions and platform images are associated with the platform type identified by the process. The platform model generated may include a number of three-dimensional images of the platform selected, with visually depicted instructions for a number of locations at which measurements are to be taken by a computer aided measurement device, for example.

The process displays the platform model and the instructions generated using a graphical user interface (operation 508). The graphical user interface may be displayed on a computer aided measurement device, such as computer aided measurement device 400 in FIG. 4, on a computer, such as computer 402 in FIG. 4, and/or on both a computer aided measurement device and an associated computer.

The process receives a number of measurement commands corresponding to the platform instructions (operation 510). For example, the platform model may include instructions for a first and second location at which a computer aided measurement device is to be placed for taking measurements. An operator, such as operator 414 in FIG. 4, may place a computer aided measurement device at a first location and provide a measurement command to the process using the graphical user interface, for example. The process then performs the number of measurements according to the number of measurement commands to form measurement data (operation 512). When a measurement command is received for a first location, a first location measurement is executed by the process to form a first measurement, and when the measurement command is received for a second location, a second location measurement is executed by the process to form a second measurement, for example. In this illustrative example, the first measurement and second measurement make up the measurement data.

The process stores the measurement data in a database (operation 514). The measurement data may be stored, for example, as number of platform measurements 426 in FIG. 4. The process then generates an alignment report using the measurement data (operation 516), with the process terminating thereafter.

The alignment report generated by the process may be used by a number of computers associated with the platform selected to adjust a number of features requiring alignment according to the report. In one illustrative example, an aircraft computer may use the alignment report to adjust a number of sensors on the aircraft.

Figure 6:
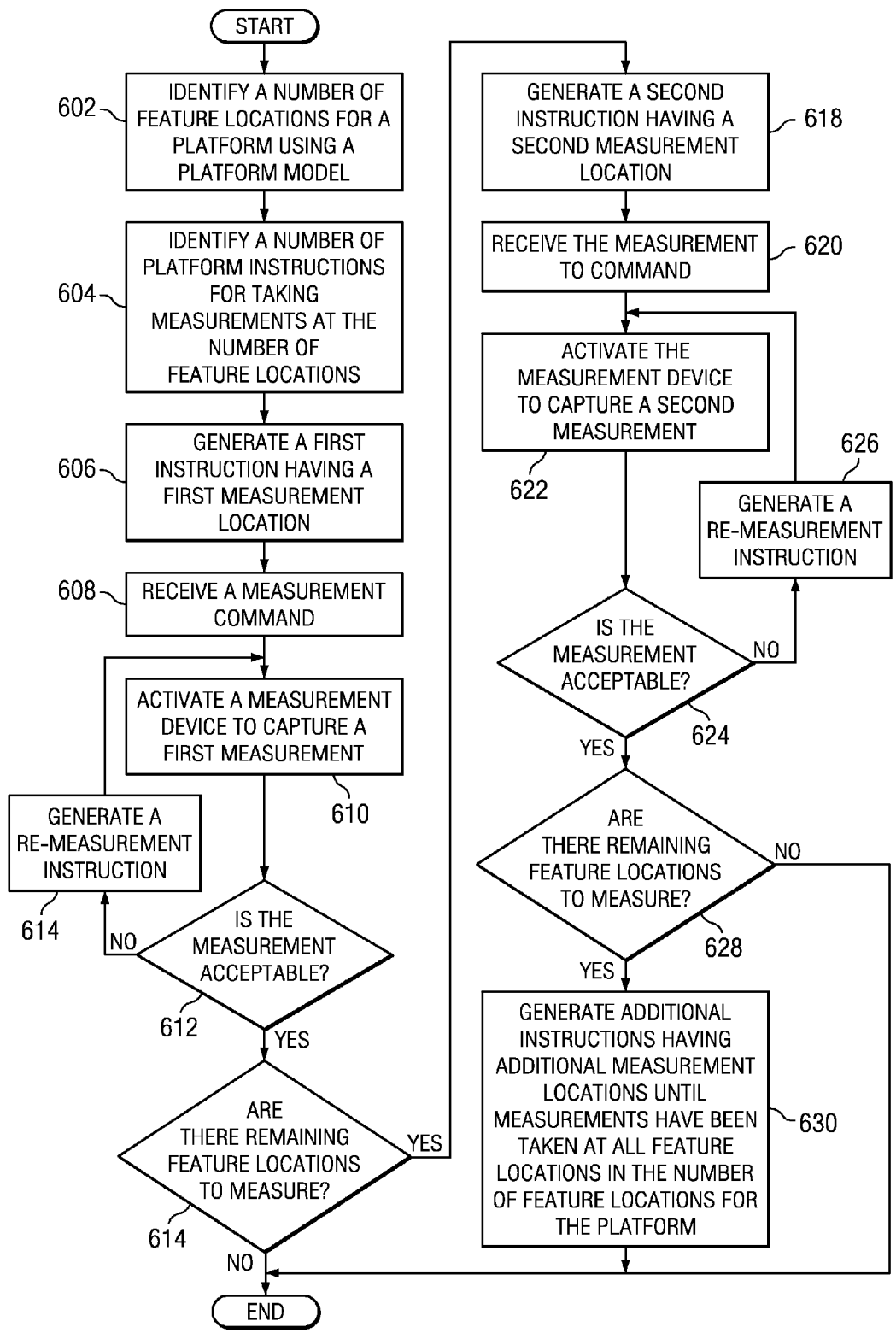
FIG. 6 is a flowchart illustrating a process for alignment of platform features in accordance with an advantageous embodiment.

With reference now to FIG. 6, a flowchart illustrating a process for alignment of platform features is depicted in accordance with an advantageous embodiment. The process in FIG. 6 may be implemented by a component such as alignment process 242 in FIG. 2 and/or alignment process 408 in FIG. 4.

The process begins by identifying a number of feature locations for a platform using a platform model (operation 602). The platform model may be generated by the alignment process upon receiving a platform selection from an operator, such as operator 234 in FIG. 2, for example.

The process identifies a number of platform instructions for taking measurements at the number of feature locations (operation 604). The number of platform instructions may include a position and angle for the computer aided measurement device in relation to the platform and/or feature location, for example.

The process generates a first instruction having a first measurement location (operation 606). The instruction may be displayed to an operator of a computer aided measurement device using a user interface, for example. The process receives a measurement command (operation 608). The measurement command may be received from the operator using a user interface in response to the first instruction displayed to the operator, for example.

The process activates a measurement device to capture a first measurement (operation 610). In this illustrative example, the process controls the function of the measurement device, and the measurement command is an indication from the operator that the device is in the correct position to take a measurement according to the instructions generated by the process.

The process determines whether the measurement is acceptable (operation 612). Acceptable measurement parameters may be pre-determined and accessible to the alignment process for this determination. In an illustrative example, acceptable measurement parameters for a specific platform type may be stored in the platform information for that platform type in a database, such as database 410 in FIG. 4. In another illustrative example, acceptable measurement parameters may be received by the alignment process via a user interface, such as user interface 412 in FIG. 4. If the measurement is not acceptable, the process generates a re-measurement instruction (operation 614) and returns to operation 610. If the measurement is acceptable, the process next determines whether there are remaining feature locations to measure (operation 616). This determination may be performed using the platform model generated by the process having the number of feature locations for a platform.

If a determination is made that there are no remaining locations to measure, the process terminates. If a determination is made that there are remaining feature locations to measure, the process generates a second instruction having a second measurement location (operation 618). An operator interacting with the process may position the measurement device according to the second instruction, for example.

The process receives the measurement command (operation 620) and activates the measurement device to capture a second measurement (operation 622). The process determines if the measurement is acceptable (operation 624). If the measurement is not acceptable, the process generates a re-measurement instruction (operation 626) and returns to operation 622. If the measurement is acceptable, the process next determines whether there are remaining feature locations to measure (operation 628).

If there are remaining feature locations to measure, the process generates additional instructions having additional measurement locations until measurements have been taken at all feature locations in the number of feature locations for the platform (operation 630), with the process terminating thereafter. If there are no remaining features to measure, the process terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account a number of different considerations. For example, the different advantageous embodiments recognize and take into account that current methods for feature alignment utilize expensive gyroscopic reference units and physical tools that bolt to each feature location of a platform. In alignment of multiple sensors on an aircraft platform, current methods require removal of each sensor before the tooling can be installed to take the measurement at a specific location.

In addition to the high precision physical tooling required for each sensor location, power supplies, cables, and specialized computers to run the gyroscope are required. In the different illustrative examples, leveling of the platform with the Earth is performed prior to measurement with the gyroscope. This operation is performed because its measurements are based on the Earth's reference.

Thus, the different advantageous embodiments provide a compiled executable process that provides a precise angular correction measurement for elevation, azimuth, and position from each sensor of a vehicle platform in relation to gyroscopic source instruments used through the use of an automated routine that drives current off the shelf computer aided measurement equipment.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for measurement of platform features, the method comprising:
    responsive to identifying a platform type, generating instructions to perform a number of measurements for a number of features associated with a platform;
    generating a platform model for the platform type identified using platform descriptions and platform images;
    displaying the platform model and the instructions generated using a graphical user interface; and
    responsive to receiving a number of measurement commands, performing the number of measurements to form measurement data.

2. The method of claim 1 further comprising:
    generating an alignment report for the platform using the measurement data.

3. The method of claim 2 further comprising:
    adjusting the number of features for the platform using the alignment report.

4. The method of claim 3, wherein the number of features comprise a plurality of sensors that require alignment and wherein adjusting the number of features further comprises:
    simultaneously aligning the plurality of sensors.

5. The method of claim 1, wherein the platform model generated comprises a number of three-dimensional images of the platform selected, and wherein the platform instructions are visually depicted using the number of three-dimensional images.

6. The method of claim 1, wherein the instructions comprise identification of a number of locations at which a measurement device is to be placed for taking measurements.

7. A method for alignment of platform features, the method comprising:
    identifying a number of feature locations for a platform using a platform model expressed as a data structure stored on a non-transitory computer readable storage medium;
    identifying, using a processor operating on the data structure, a number of platform instructions for taking measurements at the number of feature locations using the platform model;
    generating, using the processor, instructions having a number of measurement locations for each feature location in the number of feature locations for the platform;
    activating a number of measurement devices based on the instructions to capture a number of measurements; and
    calculating, using the processor, a number of alignments for each feature location using the number of measurements.

8. The method of claim 7 further comprising:
    simultaneously aligning the each feature using the number of alignments and the number of measurements.

9. The method of claim 7 further comprising:
    determining whether a first measurement in the number of measurements is acceptable; and
    in response to a determination that the first measurement is not acceptable, generating a re-measurement instruction.

10. The method of claim 9 further comprising:
    in response to a determination that the first measurement is acceptable, determining whether there are remaining feature locations to measure;
    in response to a determination that there are remaining feature locations to measure, generating a second instruction having a second measurement location;
    receiving the measurement command; and
    activating the measurement device to capture a second measurement.

11. The method of claim 10 further comprising:
    determining whether the second measurement is acceptable; and
    in response to a determination that the second measurement is not acceptable, generating the re-measurement instruction.

12. A system for alignment of platform features, the system comprising:
    a number of computer aided measurement devices;
    a number of computers configured to generate instructions for the number of computer aided measurement devices to take a number of measurements; and
    an alignment process configured to calculate a number of alignments for a number of features using the number of measurements, the number of features being physically connected to the platform.

13. The system of claim 12, wherein the alignment process is further configured to identify a number of feature locations for a platform using a platform model; identify a number of platform instructions for taking measurements at the number of feature locations using the platform model; and generate instructions having a number of measurement locations for each feature location in the number of feature locations for the platform.

14. The system of claim 12, wherein the alignment process is further configured to identify a platform type; generate instructions to perform a number of measurements for a number of features associated with a platform; generate a platform model for the platform type identified using platform descriptions and platform images; display the platform model and the instructions generated using a graphical user interface; and, responsive to receiving a number of measurement commands, perform the number of measurements to form measurement data.

15. The system of claim 14, wherein the alignment process is further configured to generate an alignment report using the measurement data.

16. A non-transitory computer readable storage medium having computer usable program code for alignment of platform features, wherein the computer usable program code is executable by a computer to:
- responsive to identifying a platform type, generate instructions to perform a number of measurements for a number of features associated with a platform;
- generate a platform model for the platform type identified using platform descriptions and platform images;
- display the platform model and the instructions generated using a graphical user interface; and
- responsive to receiving a number of measurement commands, perform the number of measurements to form measurement data.

17. The non-transitory computer readable storage medium of claim 16, wherein the computer usable program code is further executable by a computer to:
- generate an alignment report for the platform using the measurement data.

18. The non-transitory computer readable storage medium of claim 17, wherein the computer usable program code is further executable by a computer to:
- adjust the number of features for the platform using the alignment report.

19. The non-transitory computer readable storage medium of claim 18, wherein the number of features comprise a plurality of sensors that require alignment, and wherein the computer usable program code to adjust the number of features is further executable by a computer to:
- simultaneously align the plurality of sensors.

20. The non-transitory computer readable storage medium of claim 17, wherein the platform model generated comprises a number of three-dimensional images of the platform selected, and wherein the platform instructions are visually depicted using the number of three-dimensional images.

* * * * *